United States Patent
Neto et al.

(10) Patent No.: US 10,300,785 B2
(45) Date of Patent: May 28, 2019

(54) COOLING BY SUCTION OF AIR

(71) Applicant: GM GLOBAL TECHNOLOGY OPERATIONS LLC, Detroit, MI (US)

(72) Inventors: Demetrio Vettorazzo Neto, São Paulo (BR); Paulo A. Riedel, São Paulo (BR); Luiz H. Riedel, São Paulo (BR); Robert Delmotte, Harrison Township, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 4 days.

(21) Appl. No.: 15/714,089

(22) Filed: Sep. 25, 2017

(65) Prior Publication Data

US 2019/0092158 A1 Mar. 28, 2019

(51) Int. Cl.
*B60K 11/06* (2006.01)
*F01N 13/08* (2010.01)
*F16H 57/04* (2010.01)

(52) U.S. Cl.
CPC .............. *B60K 11/06* (2013.01); *F01N 13/08* (2013.01); *F16D 2300/0212* (2013.01); *F16H 57/0416* (2013.01)

(58) Field of Classification Search
CPC .............................. B60K 11/06; F16H 57/0416
See application file for complete search history.

(56) References Cited

U.S. PATENT DOCUMENTS

| | | | |
|---|---|---|---|
| 6,123,061 A | 9/2000 | Baker et al. | |
| 6,358,109 B1 * | 3/2002 | Neisen | B63H 21/32 440/89 B |
| 7,686,111 B2 * | 3/2010 | Koenekamp | B60K 1/04 180/65.1 |
| 8,527,161 B2 * | 9/2013 | Baldwin | F16D 13/72 192/113.1 |
| 9,702,281 B2 | 7/2017 | Newman et al. | |

OTHER PUBLICATIONS

"Crankcase Ventilation System," Aug. 22, 2017, available at https://en.wikipedia.org/wiki/Crankcase_ventilation_system.

* cited by examiner

*Primary Examiner* — Bryan A Evans

(57) ABSTRACT

A cooling system for an automotive propulsion system is provided. The cooling system includes a housing defining a housing inlet and a housing outlet. An exhaust pipe may be configured to be fluidly connected to an automotive engine, the exhaust pipe and defining a passageway for exhausting exhaust gases originating with the automotive engine. The housing outlet is connected in fluid communication with the passageway of the exhaust pipe, which may be through a cooling conduit. The exhaust pipe is configured to suck air from the housing outlet into the exhaust pipe to define a cooling air flow path from the housing inlet to the passageway of the exhaust pipe. In one variation, the outlet of the cooling conduit has an open end placed in a slipstream of the vehicle rather than in the exhaust pipe.

20 Claims, 2 Drawing Sheets

COOLING BY SUCTION OF AIR

FIELD

The present invention relates to a cooling system for an automotive propulsion system, and more particularly, to a cooling system that uses the engine exhaust pipe to create a suction of air to provide cooling.

INTRODUCTION

A typical automotive propulsion system includes an engine and a transmission bolted to the engine. Transmissions may be of various types, such as automatic, manual, or a hybrid of the two. Some may have stepped gear ratios, while others are continuously variable.

Automotive manual transmissions employ synchronizer torque-transmitting mechanisms to establish torque paths from a transmission input shaft to a transmission output shaft. Manual transmissions are generally countershaft-type transmissions wherein one of the first ratio gears is disposed on a main or central shaft and the other first ratio gear that meshes with the first ratio gear is supported on a countershaft parallel with the main shaft. The ratio gears mesh such that a plurality of gear ratios can be established between the input shaft and the output shaft with the power flow passing through the main shaft and countershaft.

A manual clutch is used to selective connect the engine output shaft to the transmission shaft. The manual clutch is typically disengaged while changing between gear ratios within the manual transmission. The manual clutch is relatively large, having a diameter similar to the diameter of the transmission. The manual clutch may have discs with friction lining material and a pressure plate that is considerably thick to withstand heat loads. The manual clutch assembly is sized to withstand high heat loads, especially while traveling up a hilly terrain with frequenting stopping and going. However, the large size of the manual clutch assembly presents other challenges, such as added weight. In addition, high heat to the manual clutch assembly may cause wear and early failure.

SUMMARY

The present disclosure provides a cooling system that uses the engine exhaust to create a suction to pull hot air from the manual transmission to reduce clutch temperatures. Cooling the clutch in this manner can allow for a clutch design having reduced mass, cost, package, and warranty claims.

In one form, which may be combined with or separate from the other forms disclosed herein, a cooling system for an automotive transmission of a motor vehicle is provided. The cooling system includes a transmission housing defining a housing inlet and a housing outlet and a cooling conduit extending from the transmission housing. The cooling conduit defines a channel in fluid communication with the housing outlet, and the cooling conduit has an open end. The open end is disposed in a main flow path of air such that the cooling conduit is configured to suck air from the housing outlet into the main flow path to define a cooling air flow path from the housing inlet, through the housing, out of the housing outlet, through the cooling conduit, and out of the open end.

In another form, which may be combined with or separate from the other forms described herein, a cooling system for an automotive propulsion system is provided. The cooling system includes a housing defining a housing inlet and a housing outlet and an exhaust pipe configured to be fluidly connected to an automotive engine. The exhaust pipe defines a passageway for exhausting exhaust gases originating with the automotive engine. The housing outlet is connected in fluid communication with the passageway of the exhaust pipe. The exhaust pipe is configured to suck air from the housing outlet into the exhaust pipe to define a cooling air flow path from the housing inlet to the passageway of the exhaust pipe.

In yet another form, a clutch cooling system for an automotive transmission is provided. The clutch cooling system includes a cooling conduit fluidly connecting an interior space defined by a housing with a passageway defined by an exhaust pipe.

Further additional features may be provided, including but not limited to the following: the system further comprising a cooling conduit fluidly connecting the housing outlet to the passageway of the exhaust pipe; the housing being formed by at least a portion of an automotive transmission; the housing being a bell housing of an automotive transmission; the system further comprising a clutch assembly disposed within the bell housing; the cooling air flow path being disposed in such proximity to the clutch assembly as to provide a cooling effect on the clutch assembly; the exhaust pipe being configured to suck air from the cooling conduit by virtue of a pressure differential between the cooling conduit and the passageway of the exhaust pipe; the system further comprising a catalytic converter and/or a muffler; the exhaust pipe extending through the catalytic converter and the muffler; the cooling conduit having an outlet that extends into the passageway of the exhaust pipe at a point downstream of the muffler and the catalytic converter; the outlet of the cooling conduit extending into the passageway of the exhaust pipe; the outlet of the cooling conduit extending away from an inner wall of the exhaust pipe; the cooling conduit defining an L-shaped end disposed in the passageway of the exhaust pipe; the outlet of the cooling conduit extending into the passageway of the exhaust pipe at a point downstream of a contact point for a muffler and a contact point for a catalytic converter in the exhaust pipe; the cooling conduit being configured to suck air from the transmission housing by virtue of a pressure differential between the main flow path and an interior space defined by the transmission housing; the main flow path being a slipstream of the motor vehicle; and the main flow path being defined within the exhaust pipe.

Further examples, aspects and advantages of the present disclosure will become apparent by reference to the following description and appended drawings wherein like reference numbers refer to the same component, element or feature.

BRIEF DESCRIPTION OF THE DRAWINGS

The drawings described herein are for illustration purposes only and is not intended to limit the scope of the present disclosure in any way.

DETAILED DESCRIPTION

The present disclosure provides an automotive propulsion system having an improved cooling system that uses the engine exhaust to create a suction to pull hot air from the transmission to reduce clutch temperatures. Cooling the clutch in this manner can allow for a clutch design having reduced mass, cost, package, and warranty claims.

Figure 1:
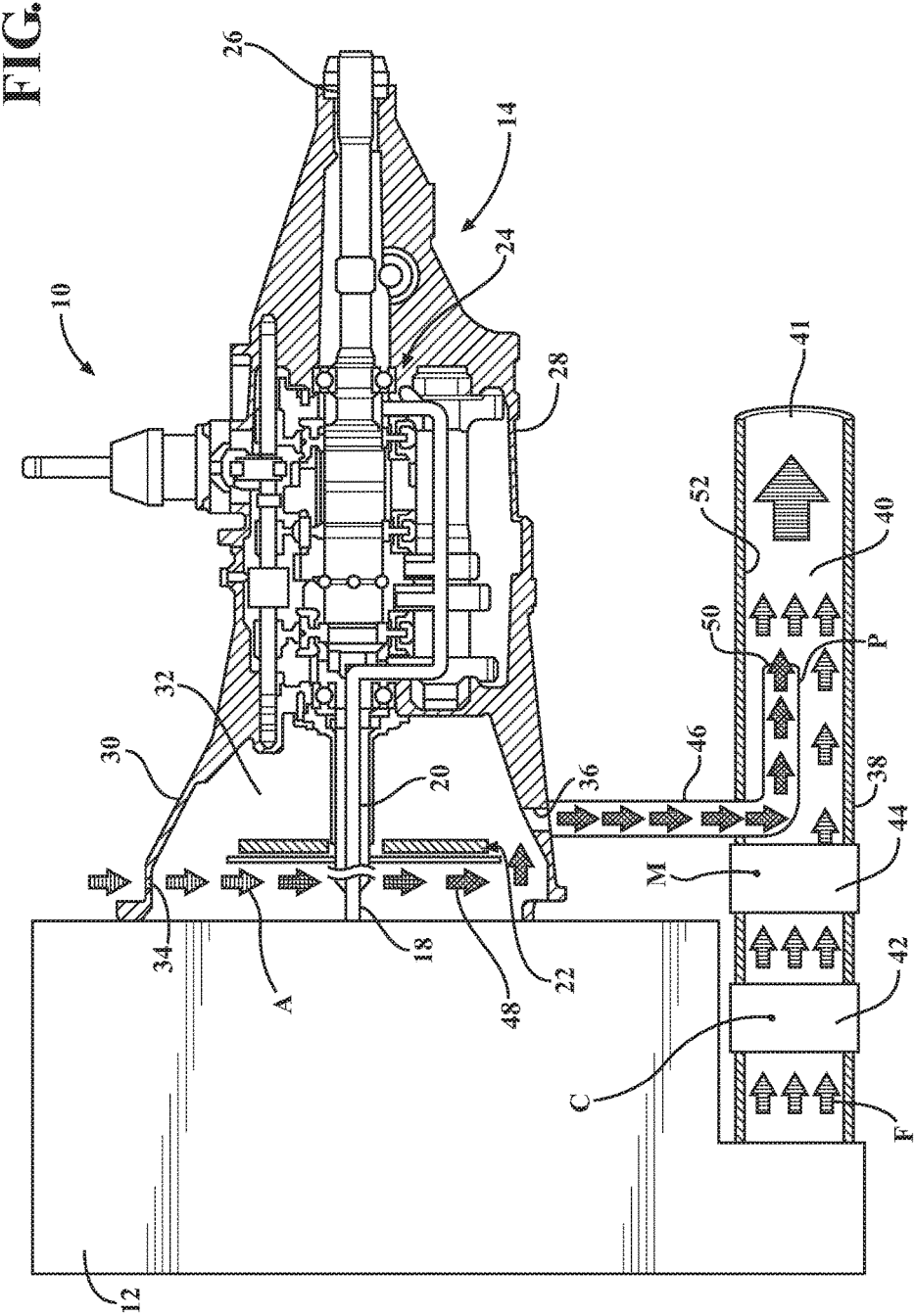
FIG. 1 is a schematic view of an automotive propulsion system having a first variation of a cooling system in accordance with the principles of the present disclosure.

With reference to FIG. 1, a schematic diagram shows an automotive propulsion system generally indicated by reference number 10. It should be appreciated at the outset that while a rear-wheel drive propulsion system 10 has been illustrated, the propulsion system 10 could alternatively be adapted for front-wheel drive, all-wheel drive, or four-wheel drive propulsion system, without departing from the scope of the present disclosure.

The propulsion system 10 generally includes an engine 12 interconnected with a transmission 14, which may be further connected with a final drive unit (not shown). The engine 12 may be a conventional internal combustion engine, a hybrid engine, or any other type of prime mover that has an exhaust pipe, without departing from the spirit and scope of the present disclosure. The engine 12 supplies a driving engine output torque to the transmission 14 via a shaft 18. The driving engine output torque may be transmitted through the shaft 18 to the transmission 14 through an input shaft 20, where the shaft 18 is selectively connected to the input shaft 20 through a selective coupling device such as a manual transmission clutch assembly 22.

The transmission 14 may be a stepped transmission having planetary gears, a countershaft transmission, a continuously variable transmission, or an infinitely variable transmission. In the illustrated example, the transmission 14 is a manual transmission having a plurality of shafts and synchronizer gears 24 configured to transmit torque from the input shaft 20 to an output shaft 26 and ultimately to a set of wheels (not shown). Torque from the transmission input shaft 20 is communicated through the shafts and synchronizer gears 24 to the transmission output shaft 26, where the combinations and connections of the shafts and synchronizer gears 24 can be changed to change the speed ratio of the input shaft 20 to the output shaft 26. The transmission 14 includes a transmission case main part 28 attached to a bell housing 30, which form a housing for the transmission 14. The manual clutch assembly 22 is generally disposed in an interior space 32 of the transmission 14 defined by the bell housing 30.

In this example, the bell housing 30 defines a housing inlet 34 and a housing outlet 36 for air to travel through, as will be explained in further detail below. In the alternative, housing inlet 34 and outlet 36 could be formed in the main part of the transmission case 28 or in a housing of the engine 12.

An exhaust pipe 38 is fluidly connected to the engine 12 and defines a passageway 40 for exhausting exhaust gases from the engine 12 through an outlet 41 of the exhaust pipe 38. One or more catalytic converters 42 and a muffler 44 may be disposed in the exhaust pipe 38, such that the exhaust pipe 38 can be said to extend through the catalytic converter(s) 42 and the muffler 44; in other words, the passageway 40 extends through the catalytic converter(s) 42 and the muffler 44.

In this example, a cooling conduit 46 fluidly connects the housing outlet 36 to the passageway 40 of the exhaust pipe 38. The cooling conduit 46 may be a pitot tube configured to transmit air from the interior space 32 of the bell housing 30 to the inner passageway 40 of the exhaust pipe 38.

In the illustrated example, the cooling conduit 46 has an outlet 50 that extends into the passageway 40 of the exhaust pipe 38 at a point P that is downstream of the muffler 44 and the catalytic converter 42. Thus, the outlet 50 of the cooling conduit 46 extends into the passageway 40 at a point P that is downstream of a contact point M for the muffler 44 and the contact point C for the catalytic converter 42 in the exhaust pipe 38. In other words, point M is where the muffler 44 contacts the exhaust pipe 38, point C is where the catalytic converter 42 contacts the exhaust pipe 38, and point P is where the outlet 50 of the cooling conduit 46 extends into exhaust pipe 38; and point P is downstream of points C and M.

The outlet 50 of the cooling conduit 46 extends into the passageway 40 of the exhaust pipe 38 away from an inner wall 52 of the exhaust pipe 38. In this example, the cooling conduit 46 defines an L-shaped end disposed in the passageway 40 of the exhaust pipe 38.

The exhaust pipe 38 has a stream F of exhaust gases flowing therethrough, which originates with the engine. Therefore, the flow of the exhaust gases F create a suction on the cooling conduit 46, and thus the exhaust pipe 38 is configured to suck air from the housing outlet 36, through the cooling conduit 46, and into the exhaust pipe 38. The exhaust pipe 38 is configured to suck air from the cooling conduit 46 by virtue of a pressure differential between the cooling conduit 46 and the passageway 40 of the exhaust pipe 38. A cooling air flow path 48 is thus established from the housing inlet 34, through the interior space 32 of the bell housing 30 and past the clutch assembly 22, out of the housing outlet 36, through the cooling conduit 46, and through the passageway 40 of the exhaust pipe 38.

As the cooling air A travels along the cooling air flow path 48, it is warmed by the heat in the interior space 32 of the bell housing 30 and the heat within the exhaust pipe 38. Accordingly, as shown by the arrows of the cooling air A in FIG. 1, the cooling air A starts off at a cool ambient temperature (shown with blue cross-hatching) and is heated along the flow path, shown with yellow, orange, and red cross-hatching as the air A heats up. The cooling air flow path 48 is disposed in such proximity to the clutch assembly 22 as to provide a cooling effect on the clutch assembly 22.

Thus, a cooling system is established by placing the housing inlet 34 and outlet 36 in fluid communication with the passageway 40 of the exhaust pipe 38. In this example, a cooling conduit 46 is used to establish fluid communication between the outlet 36 and the passageway 40 of the exhaust pipe 38, but it should be understood that the fluid communication between the outlet 36 and the passageway 40 of the exhaust pipe 38 could alternatively be established in any other suitable way.

Figure 2:
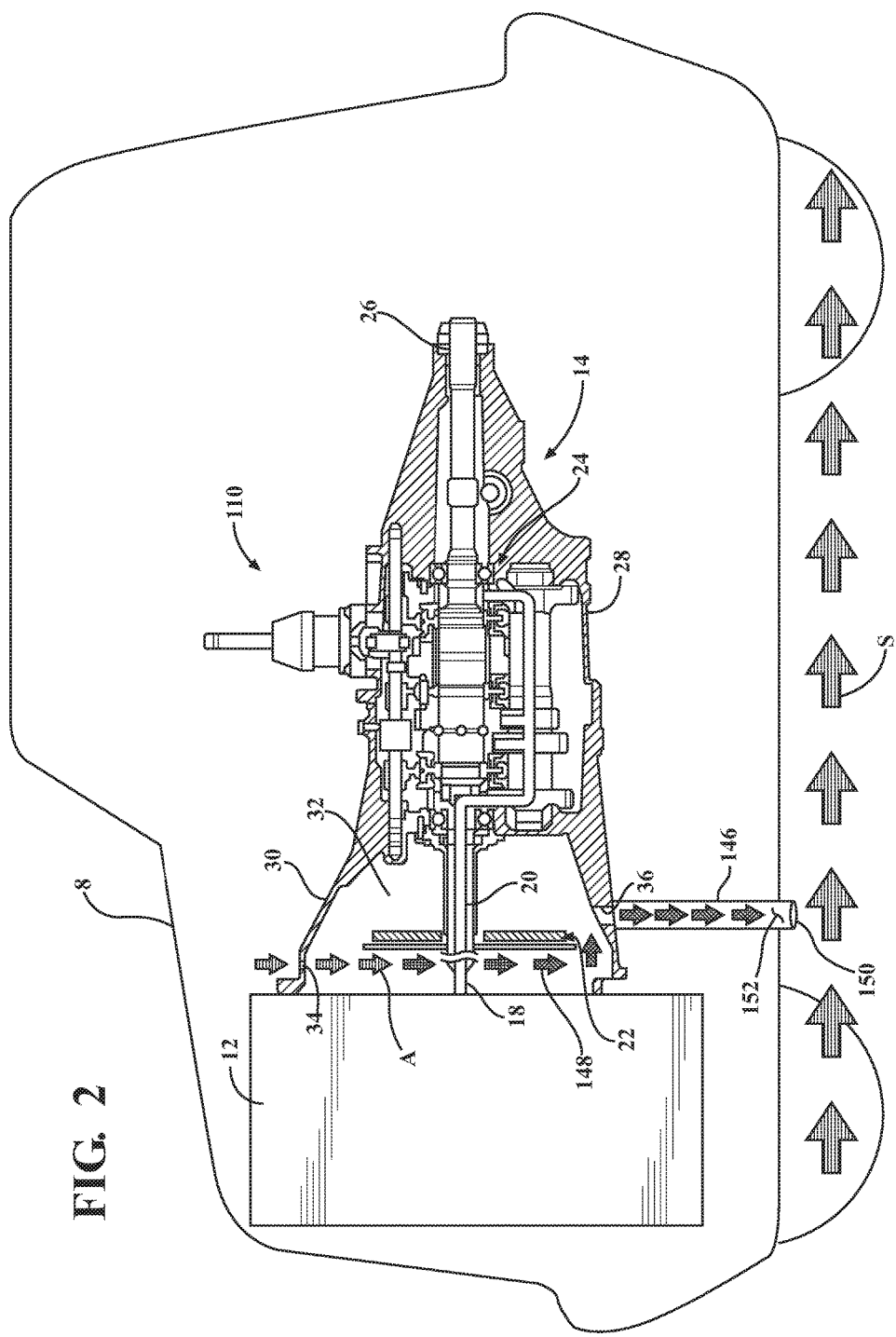
FIG. 2 is a schematic view of an automotive propulsion system having a second variation of a cooling system in accordance with the principles of the present disclosure.

With reference to FIG. 2, another example of an automotive propulsion system is generally indicated by reference number 110. Except where described as being different, the automotive propulsion system 110 may have the same or similar components or variations as those described above with respect to the automotive propulsion system of FIG. 1. For example, the propulsion system 110 generally includes an engine 12 interconnected with a transmission 14, which may be further connected with a final drive unit (not shown), and which may have any of the other features described above. The transmission 14 includes a transmission case main part 28 attached to a bell housing 30, which form a housing for the transmission 14. The manual clutch assembly 22 is generally disposed in an interior space 32 of the transmission 14 defined by the bell housing 30. The bell housing 30 defines a housing inlet 34 and a housing outlet 36 for air to travel through, as will be explained in further detail below. In the alternative, housing inlet 34 and outlet 36 could be formed in the main part of the transmission case 28 or in a housing of the engine 12.

A cooling conduit 146 extends from the bell housing 30. In other variations, the cooling conduit 146 could extend from the main part 28 of the transmission 14, without falling beyond the spirit and scope of the present disclosure. The cooling conduit 146 defines a channel 152 in fluid communication with the housing outlet 36, and the cooling conduit 146 has an open end 150. The open end 150 is disposed in a main flow path S of air such that the cooling conduit 146 is configured to suck air from the housing outlet 36 into the main flow path S to define a cooling air flow path 148 from the housing inlet 34, through interior space 32 defined by the bell housing 30, out of the housing outlet 36, through the cooling conduit 146, and out of the open end 150.

Similar to the description above in FIG. 1, the cooling air A is disposed in such proximity to the clutch assembly 22 as to provide a cooling effect on the clutch assembly 22. The cooling conduit 146 is configured to suck air from the bell housing 30 (or main housing 28) by virtue of a pressure differential between the main flow path S and the interior space 32 defined by the bell housing 30 (or main part 28).

In the example of FIG. 2, the main flow path S may be a slipstream of the motor vehicle 8 or an area under the propulsion system 110 that has a flow path created by road draft. Therefore, the main flow path S of the road draft or slipstream creates a suction on the cooling conduit 146, and thus the cooling conduit 146 is configured to suck air from the housing outlet 36, through the cooling conduit 146, and into the main flow path S. The cooling conduit 146 is configured to suck air by virtue of a pressure differential between the open end 150 of the cooling conduit 146 and/or main flow path S and the interior space 32 defined by the bell housing 30. A cooling air flow path 148 is thus established from the housing inlet 34, through the interior space 32 of the bell housing 30 and past the clutch assembly 22, out of the housing outlet 36, through the cooling conduit 146, and out of the open end 150 of the cooling conduit 146.

The cooling systems of the present disclosure as shown in FIGS. 1 and 2 are configured to create a suction and pull hot air out from the bell housing 30 to allow cooler air A to flow past the clutch assembly 22, and therefore to cool the clutch assembly 22 and reduce the working temperature of the clutch assembly 22. With a lower working temperature, the clutch design can be simplified, for example, by using less expensive clutch lining material and less mass, leading to a reduction in cost. A more compact clutch design can be used for the clutch assembly 22, and as a result, a more compact transmission 14 and propulsion system 10 can be achieved. Furthermore, warranty claims may be reduced by protecting clutch system endurance and integrity by virtue of the cooling system described herein. When the clutch mass is reduced, clutch inertia may be reduced, which is beneficial to operation of the synchronizers 24 during gear shifts because the shifts are not as hard on the synchronizers 24.

The description herein is merely exemplary in nature and variations that do not depart from the gist of the disclosure are intended to be within the scope of the disclosure. Such variations are not to be regarded as a departure from the spirit and scope of the disclosure.

What is claimed is:

1. A cooling system for an automotive transmission of a motor vehicle, the cooling system comprising:
   a transmission housing defining a housing inlet and a housing outlet, the housing inlet being open to a surrounding environment without further connection;
   a cooling conduit extending from the transmission housing, the cooling conduit defining a channel in fluid communication with the housing outlet, the cooling conduit having an open end, the open end being disposed in a main flow path of air such that the cooling conduit is configured to suck air from the housing outlet into the main flow path to define a cooling air flow path from the housing inlet, through the housing, out of the housing outlet, through the cooling conduit, and out of the open end.

2. The cooling system of claim 1, wherein the transmission housing is a bell housing of an automotive transmission.

3. The cooling system of claim 2, further comprising a clutch assembly disposed within the bell housing, the cooling air flow path being disposed in such proximity to the clutch assembly as to provide a cooling effect on the clutch assembly.

4. The cooling system of claim 3, the cooling conduit being configured to suck air from the transmission housing by virtue of a pressure differential between the main flow path and an interior space defined by the transmission housing.

5. The cooling system of claim 4, wherein the main flow path is a slipstream created by road draft of the motor vehicle.

6. The cooling system of claim 5, further comprising an exhaust pipe, the main flow path being defined within the exhaust pipe.

7. The cooling system of claim 6, further comprising:
   a catalytic converter; and
   a muffler, the exhaust pipe extending through the catalytic converter and the muffler, the cooling conduit having an outlet that extends into the passageway of the exhaust pipe at a point downstream of the muffler and the catalytic converter.

8. The cooling system of claim 7, the outlet of the cooling conduit extending into the passageway of the exhaust pipe away from an inner wall of the exhaust pipe, the cooling conduit defining an L-shaped end disposed in the passageway of the exhaust pipe.

9. A cooling system for an automotive propulsion system, the cooling system comprising:
   a clutch assembly;
   a transmission component housing surrounding the clutch assembly and defining a housing inlet and a housing outlet;
   an exhaust pipe configured to be fluidly connected to an automotive engine and defining a passageway for exhausting exhaust gases originating with the automotive engine, the housing outlet being connected in fluid communication with the passageway of the exhaust pipe, the exhaust pipe being configured to suck air from the housing outlet into the exhaust pipe to define a cooling air flow path through the transmission component housing from the housing inlet to the passageway of the exhaust pipe.

10. The cooling system of claim 9, further comprising a cooling conduit fluidly connecting the housing outlet to the passageway of the exhaust pipe, the exhaust pipe being configured to suck air from the cooling conduit by virtue of a pressure differential between the cooling conduit and the passageway of the exhaust pipe.

11. The cooling system of claim 10, wherein the transmission component housing is formed by at least a portion of an automotive transmission.

12. The cooling system of claim 10, wherein the transmission component housing is a bell housing of an automotive transmission, the clutch assembly being disposed within the bell housing, the cooling air flow path being disposed in such proximity to the clutch assembly as to provide a cooling effect on the clutch assembly.

13. The cooling system of claim 12, the exhaust pipe being configured to extend through a catalytic converter and a muffler, the cooling conduit having an outlet that extends into the passageway of the exhaust pipe at a point downstream of the muffler and the catalytic converter, the cooling conduit having an outlet that extends into the passageway of the exhaust pipe and away from an inner wall of the exhaust pipe, the cooling conduit defining an L-shaped end disposed in the passageway of the exhaust pipe.

14. A clutch cooling system for an automotive transmission, the clutch cooling system comprising:
an exhaust pipe configured to be fluidly connected to an automotive engine and defining a passageway for exhausting exhaust gases originating with the automotive engine;
a housing defining an interior space; and
a cooling conduit fluidly connecting the interior space defined by the housing with the passageway defined by the exhaust pipe.

15. The clutch cooling system of claim 14, wherein the housing defines a housing inlet and a housing outlet, the cooling conduit being connected to the housing at the housing outlet.

16. The clutch cooling system of claim 15, the housing being formed of at least a portion of an automotive transmission.

17. The clutch cooling system of claim 15, the housing being a bell housing of an automotive transmission.

18. The clutch cooling system of claim 17, the cooling conduit being in fluid communication with the passageway of the exhaust pipe such that the exhaust pipe is configured to suck air from the housing outlet into the exhaust pipe to define a cooling air flow path from the housing inlet to the passageway of the exhaust pipe.

19. The clutch cooling system of claim 18, further comprising a clutch assembly disposed within the bell housing, the cooling air flow path being disposed in such proximity to the clutch assembly as to provide a cooling effect on the clutch assembly, the exhaust pipe being configured to suck air from the cooling conduit by virtue of a pressure differential between the cooling conduit and the passageway of the exhaust pipe.

20. The clutch cooling system of claim 19, the cooling conduit having an outlet that extends into the passageway of the exhaust pipe and away from an inner wall of the exhaust pipe, the cooling conduit defining an L-shaped end disposed in the passageway of the exhaust pipe, the outlet of the cooling conduit extending into the passageway of the exhaust pipe at a point downstream of a contact point for a muffler and a contact point for a catalytic converter in the exhaust pipe.

* * * * *